Jan. 17, 1956  C. D. SMITH  2,731,055
NONMETALLIC ENCLOSURE
Filed Aug. 21, 1951  2 Sheets-Sheet 1
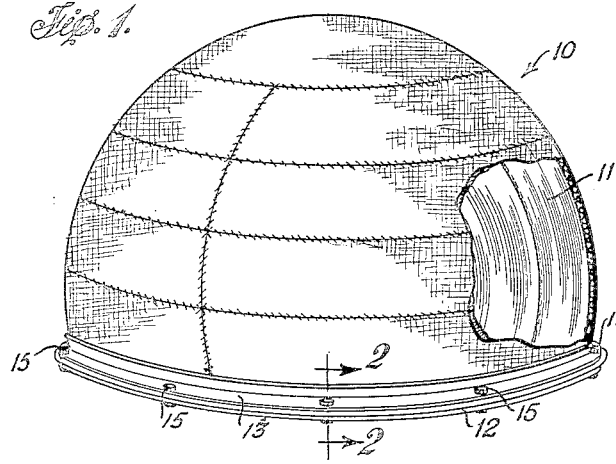
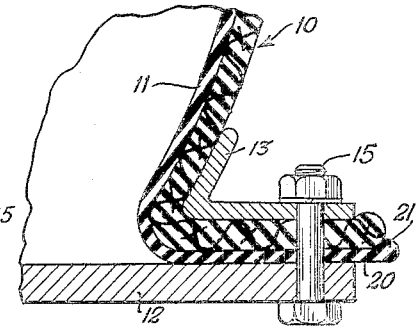
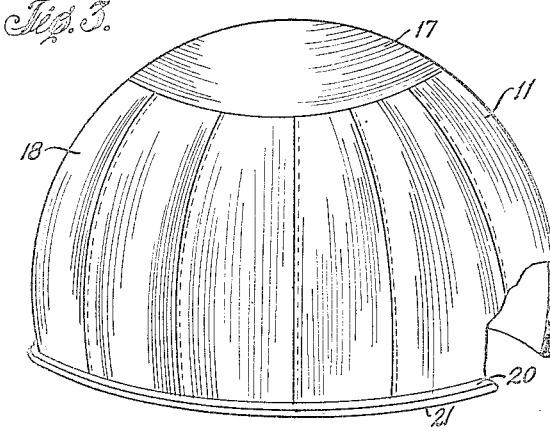
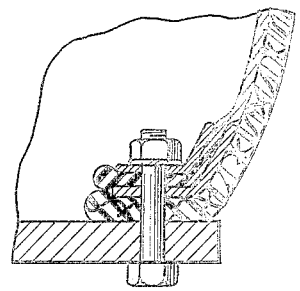
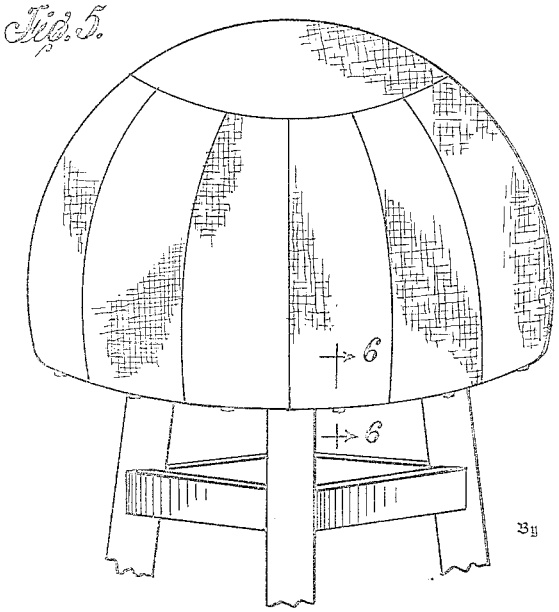
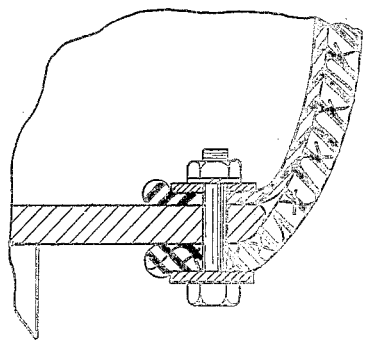
Inventor
Clifford D. Smith
Ely r Frye
Attorneys Jan. 17, 1956  C. D. SMITH  2,731,055
NONMETALLIC ENCLOSURE Filed Aug. 21, 1951  2 Sheets-Sheet 2

INVENTOR.
Clifford D. Smith
BY
Ely T Frye
ATTYS.

2,731,055
Patented Jan. 17, 1956

2,731,055

NONMETALLIC ENCLOSURE

Clifford D. Smith, Akron, Ohio, assignor to The Firestone Tire & Rubber Company, Akron, Ohio, a corporation of Ohio Application August 21, 1951, Serial No. 242,814

1 Claim. (Cl. 150—52)

This invention relates to improvements in non-metallic enclosures of the type adapted to be maintained in an inflated condition by a differential between internal and external pressures.

The primary object of the invention resides in the provision of an improved non-metallic enclosure or housing particularly adapted for use in the protection of radar equipment or the like. It is often desirable to mount radar equipment in locations which offer no fixed structures for the protection of the delicate electronic equipment associated therewith. It is sometimes desirable to mount such equipment on elevated platforms substantially above the ground level. Such equipment includes an antenna usually mounted for 360° rotation as well as for training in azimuth for the transmission and reception of signals of micro-wave frequencies. It is desired completely to house the antenna, as well as the associated transmitting and receiving equipment and power supplies, but since both the transmission and reception of such signals would be adversely affected by the presence of metal in the surrounding structure, it is desirable to provide an adequate protective enclosure containing no metal components. Inflatable structures, fabricated of non-metallic materials, have been suggested, and it is toward both the improvement and simplification of such structures that the invention primarily is directed.

An important object of the invention is to provide a simple non-metallic enclosure adapted for shipment in knock-down form and for rapid assembly without the use of special tools or equipment.

Another object of the invention is to provide a non-metallic enclosure consisting of a lightweight expandable bladder or liner adapted for shipment in collapsed condition and a plurality of non-expandable housing members to provide a unitary housing or enclosure when assembled about said bladder, with the interior of the bladder maintained at a pressure higher than atmospheric.

A further object is to provide a partially spherical non-metallic protective structure adapted for mounting, in fluid-sealing relation, to a planate base element.

A still further object is to provide improved means for effecting a fluid seal between a semi-spherical non-metallic housing structure and a rigid base member.

A still further object is to provide improved means rapidly to effect marginal joining of plural segments of an open-ended housing, the segments of which are of non-metallic material and the open end of which is adapted for marginal sealing to an enclosure member.

Another object is generally to improve and simplify the construction of inflatable non-metallic housings for one or more of the above-mentioned purposes.

Other objects and advantages will be readily apparent to persons skilled in the art upon examination of the drawings, the specification, and the appended claim.

In the drawings, in which like parts are identified by the same reference numerals:

Fig. 1 is an elevational view of an inflatable non-metallic housing, with the present invention incorporated therein;

Fig. 2 is a fragmentary section, in enlarged detail, taken along line 2—2 of Fig. 1;

Fig. 3 is an elevational view of a bladder type inner liner of the type shown incorporated in the device of Figs. 1 and 2;

Fig. 4 illustrates in fragmentary detail an alternate means for clamping a bladder type liner and a non-expandable outer enclosure in fluid-sealing relation with a planate enclosure member forming the basis of the completed assembly;

Fig. 5 illustrates a modification of the invention;

Fig. 6 is a section, shown in fragmentary enlarged detail, along line 6—6 of Fig. 5, illustrating an alternate manner in which the bladder liner and the outer housing material are marginally clamped, in fluid-sealing engagement, to a base enclosure member.

Figure 7:
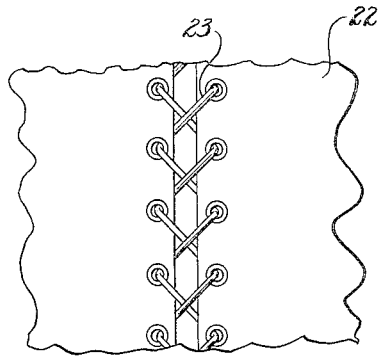
Figs. 7, 8, 9 illustrate means for joining segments of the non-metallic housing.

As best shown in Fig. 1, the device includes an outer housing generically designated 10, shown partially broken away to show a bladder type liner 11. A planate base enclosure member 12 provides support for the assembly, the liner 11 and housing 10 being maintained in clamped engagement to said base enclosure member 12 by a sealing ring 13 retained under clamping pressure by a plurality of clamping bolts 15. Bladder 11, best shown in Fig. 3, may be assembled in any known manner, for example by marginally sealing, such as by vulcanizing, a cap member 17 which may be pre-formed such as by molding, and a plurality of segmental elements such as 18, adapted to define, upon complete assembly of the bladder, a partially spherical fluid-retaining liner. The lower margins of elements 18 are provided with flange portions 20, preferably beaded at 21. Liner or bladder 11 is adapted for shipment as a unitary assembly, the walls thereof being of a material which may or may not be extensible, such as rubber inner tube stock, or, for example, balloon cloth, permitting the liner to be collapsed to present minimum volume during shipment and handling. In the event the bladder 11 is constructed of non-extensible material, such as balloon cloth, the bladder is of slightly larger dimension than the outer housing, to prevent the bladder material which is of substantially lighter weight than the housing material, from stresses due to the pressure differential maintained between the interior and the exterior thereof.

Figure 8:
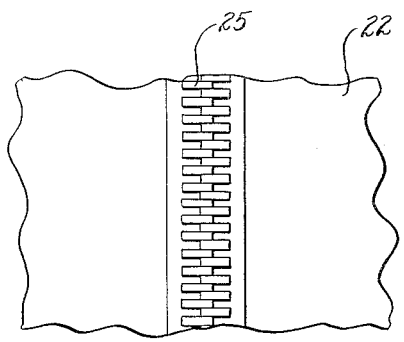
Figure 9:
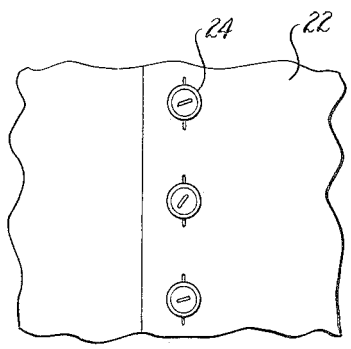

Structures of the type defined above are often required in isolated areas which are accessible only to persons on skis, snow shoes, or by dog sleds. It therefore becomes imperative that the heavier components of the structure be kept down to a weight which can be handled, as individual units, by this means of transportation. It has been found that such a structure may be transported to even the most isolated areas if the components are kept to a maximum weight of, for example 250 pounds. It is therefore contemplated that the total weight of the largest of the segmental portions of the outer housing, as shown in Figs. 1 and 5, be of such a dimension, in respect to the weight per foot pound of the material employed, as to effect the above stated weight limitation. The segmental sections of housing 22 may be marginally joined by lacing 23 (Fig. 7), buttons 24 (Fig. 9) or if the housed instruments are not sensitive to small metal fittings by zippers 25 (Fig. 8). The zippers may be either metal or plastic. It is equally important that the bladder, which is of unitary assembly, be kept within the desired weight limitation. The bladder 11, which serves as a fluid retaining seal for the outer housing, as above stated, may be of any suitable lightweight material which serves as an effective barrier to the diffusion of gas, as for instance silk, lightweight airplane cloth, balloon cloth, lightweight rubber sheeting, or any of the recently developed films of synthetic materials commonly referred to as plastics. The method of effecting a permanent seal marginally of the various components making up the inner liner or bladder is a matter of choice. In the event rubberized balloon cloth is employed, the material is normally cemented, whereas if plastic film is employed, the thermosetting properties thereof may be taken advantage of by marginally heat sealing the components.

What is claimed is:

In a device for protecting delicate instruments from the ravages of weather, the combination of a flexible weather resistant gas impervious housing adapted to contain a volume of gas under pressure slightly greater than atmospheric; said housing comprising an expandable, air impervious hood shaped bladder, a non-extensible protective enclosure for said bladder coextensive therewith, a base plate, and common means for marginally joining said bladder and said enclosure to said plate in fluid sealing engagement whereby said volume of air supports said housing.

References Cited in the file of this patent

UNITED STATES PATENTS

| | | |
|---|---|---|
| 468,455 | Giessmann | Feb. 9, 1892 |
| 1,395,485 | Duncan | Nov. 1, 1921 |
| 1,943,191 | Schwemlein | Jan. 9, 1934 |
| 2,074,159 | Bailey | Mar. 16, 1937 |
| 2,087,046 | Rutan | July 13, 1937 |
| 2,097,985 | Maryott | Nov. 2, 1937 |
| 2,117,314 | Goodrich | May 17, 1938 |
| 2,300,408 | Deerwester | Nov. 3, 1942 |
| 2,347,379 | Feeter | Apr. 25, 1944 |
| 2,437,058 | Waters | Mar. 2, 1948 |
| 2,446,811 | Crawford | Aug. 10, 1948 |
| 2,497,186 | Pedersen | Feb. 14, 1950 |
| 2,517,757 | Alderstein | Aug. 8, 1950 |
| 2,633,172 | Treiber | Mar. 31, 1953 |